United States Patent
Coromina

(10) Patent No.: US 8,238,814 B2
(45) Date of Patent: Aug. 7, 2012

(54) MULTI-BEAM COMMUNICATION SATELLITE ANTENNA WITH FAILURE COMPENSATION

(75) Inventor: Francesc Coromina, Katwijk (NL)

(73) Assignee: Agence Spatiale Europeenne, Paris (FR)

( * ) Notice: Subject to any disclaimer, the term of this patent is extended or adjusted under 35 U.S.C. 154(b) by 193 days.

(21) Appl. No.: 12/841,786

(22) Filed: Jul. 22, 2010

(65) Prior Publication Data

US 2010/0291866 A1 Nov. 18, 2010

Related U.S. Application Data

(62) Division of application No. 10/958,465, filed on Oct. 4, 2004, now Pat. No. 7,769,343.

(30) Foreign Application Priority Data

Oct. 3, 2003 (FR) ..................... 03 11626

(51) Int. Cl.
*H04B 3/36* (2006.01)
*H04B 7/185* (2006.01)

(52) U.S. Cl. ............ 455/8; 455/13.3; 455/13.4

(58) Field of Classification Search .......... 455/8, 9, 455/562.1, 103, 127.2, 127.3, 12.1, 13.3, 455/13.4; 342/367, 368
See application file for complete search history.

(56) References Cited

U.S. PATENT DOCUMENTS

| | | | |
|---|---|---|---|
| 5,428,600 A | 6/1995 | Potier | |
| 5,818,388 A | 10/1998 | Lane et al. | |
| 5,978,652 A | 11/1999 | Burr et al. | |
| 6,043,790 A | 3/2000 | Derneryd et al. | |
| 6,246,364 B1 | 6/2001 | Rao et al. | |
| 6,320,540 B1 | 11/2001 | Meredith | |
| 6,424,216 B2 | 7/2002 | Mu et al. | |
| 7,139,526 B2 * | 11/2006 | Nicol et al. | 455/13.4 |
| 2002/0005800 A1 | 1/2002 | Caille et al. | |
| 2002/0168974 A1 | 11/2002 | Rosen et al. | |
| 2004/0224633 A1 | 11/2004 | Coromina et al. | |
| 2004/0259497 A1 | 12/2004 | Dent | |
| 2004/0266470 A1 | 12/2004 | Di Camillo et al. | |

FOREIGN PATENT DOCUMENTS

| | | |
|---|---|---|
| EP | 0 901 219 A2 | 3/1999 |
| EP | 0 963 005 A2 | 8/1999 |
| EP | 1 293 798 A | 3/2003 |

OTHER PUBLICATIONS

Arbesser-Rastburg, B. et al., "R&D Directions for Next Generation Broadband Multimedia Systems: An Esa Perspective", American Institute of Aeronautics and Astronautics, Inc. (2002), (14 pages).

* cited by examiner

*Primary Examiner* — Nguyen Vo
(74) *Attorney, Agent, or Firm* — Cozen O'Connor

(57) ABSTRACT

A radio frequency radiation module includes a beam forming network capable of applying a signal including contributions to several beams, to several channels. Each channel has a high power amplifier without redundant units, and an antenna radiating feed connected to the output of the amplifier. The beam forming network has a device for selective compensation for failure of one of the channels, increasing the power of the contribution of at least one of the signals to a beam for which the radiation is affected by the failure.

6 Claims, 3 Drawing Sheets

MULTI-BEAM COMMUNICATION SATELLITE ANTENNA WITH FAILURE COMPENSATION

CROSS-REFERENCE TO RELATED APPLICATION AND PRIORITY CLAIM

This is a divisional of U.S. patent application Ser. No. 10/958,465, filed on Oct. 4, 2004, now U.S. Pat. No. 7,769,343 which claims priority on French patent application no. 0311626, filed in France on Oct. 3, 2003.

FIELD OF THE INVENTION

This invention relates to a method of operating multiple beam communication satellite antennas and particularly to a method of operating a radiation module of a multiple beam communication satellite antenna capable of compensating for failures of its high power amplifiers and with flexible allocation of power to the beams.

BACKGROUND OF THE INVENTION

A known antenna of the multiple focussed beams type with failure correction means is known. The front end of this antenna comprises a beam forming network (subsequently called a BFN) supplying input signals to a set of multiport amplifiers (subsequently called MPA). There are as many MPA as the maximum number of radiating feed used by any beam. Every beam uses one radiating feed belonging to each of the MPAs. The MPA has an input matrix separating signals corresponding to each input port, through an input matrix such that all beam signals are amplified by a set of high power amplifiers (subsequently called HPA) connected on the output side. Thus, independently of the beam power distribution between different input ports, an equal load is obtained for all HPAs that belong to the same MPA. Depending on the input port considered, the input matrix generates different relative phases at HPA inputs. An output matrix is connected to the output of HPAs and once again separates signal belonging to each input port, and applies them to the corresponding output port. This antenna transmit front end architecture is called multimatrix in the literature.

This antenna has HPA failure correction means. Thus, the antenna has redundant HPAs and redundancy circuits that will make the necessary switchings to replace a failed HPA in service by a redundant HPA. Thus, the total radio frequency power can be maintained.

There are several problems with this antenna. Redundancy circuits require a significant number of RF switches and redundant HPAs. Consequently, electrical losses, the mass, size, complexity, probability of failure and cost of the antenna are high. These disadvantages are more serious because the antenna is a mass that can be installed on a satellite and put into orbit.

Furthermore, high losses are caused by the accumulation of losses in the matrices, in the redundancy circuits, in wave guides, in insulators and in radiation filters, particularly in the Ku and Ka bands.

Due to the large size of the antenna, a wave guide or long coaxial cables are used to connect the antenna radiating feeds, leading to additional losses.

Furthermore, the antenna requires good phase and amplitude tracking between the different HPAs, so as to guarantee good isolation of RF beams. This problem increases with the operating frequency and is very acute in the Ka band. Consequently, phase and amplitude control tracking elements are required to correct phase and amplitude tracking errors due to temperature and aging. Furthermore, after each modification to the configuration of the redundancy circuit, phase and amplitude tracking of the MPA structure must be readjusted so as to guarantee good isolation of the RF beam.

Operation of HPAs in multi-carrier mode requires a reduction of the output back-off (OBO) power equal to more than 4 dB to obtain acceptable linearity performances. This problem is worsened by the fact that assignment of different powers to the different beams and due to the excitation dynamics of multiple radiating feeds contributing to forming each beam.

MPAs have been successfully used in the L and S bands in different missions. However, it is difficult to use the MPA concept at higher frequencies (Ku and Ka bands) because the problems mentioned above are further amplified. It is well known that phase and amplitude tracking errors are limited by the use of large MPAs (for example 16×16). However, redundant HPA amplifiers and the associated switching matrices are still necessary to maintain power and beam isolation within acceptable limits.

SUMMARY OF THE INVENTION

One object of the invention is to provide a radiation module for a multiple beam communication satellite antenna that solves one or several of these disadvantages.

This and other objects are attained in accordance with one aspect of the invention directed a radio frequency radiation module for a spatial telecommunication antenna, that includes a beam forming network capable of applying a signal including contributions to several beams, to the input of several channels. Each channel has a high power amplifier with an adjustable bias point and an antenna radiating feed connected to the output of the high power amplifier. The beam forming network has a device for selective compensation for failure of one of the channels, increasing the power of the contribution of at least one of the signals to a beam for which the radiation is affected by the failure.

According to one variant, the compensation device includes a reception input for a remote control signal, and the increase in the power of the contribution is made as a function of the received signal.

According to yet another variant, the beam forming network includes a contribution to the same beam in signals applied to several channels.

According to another variant, each of the amplifiers is provided with an adjustable power supply with a reception input of a remote control signal and at least one output for application of an amplifier bias point adjustment voltage as a function of the said control signal.

According to another variant, the amplifiers are travelling wave tube amplifiers (subsequently called TWTA).

According to one variant, the adjustment output includes an output connected to the anode of the amplifier and an output connected to the amplifier collector.

According to one alternative, the amplifiers are semiconductor amplifiers.

It would also be possible for the initial bias point of the amplifiers to be adjusted such that the output power of the amplifier is at least 3 dB less than its maximum output power.

One aspect of the invention relates to a spatial telecommunication antenna comprising such a radiation module.

Another aspect of the invention is directed to a method of compensating for a failure of one channel of such a module, that includes determination of one of the module channels having a failure, determination of a beam of the module for which the radiation is affected by the channel failure, and determination of a signal with a contribution to this beam. A beam compensation control signal is sent, remotely from the module, toward the input of the compensation device. The power of the contribution of at least one of the said signals to the said beam is increased as a function of the compensation control signal, by the beam forming network.

The antenna may previously be inserted into orbit.

According to one variant, the method also includes steps for sending of a beam compensation control signal, remotely from the module, toward the input of the amplifier power supply of a channel contributing to this beam, and application of an adjustment voltage of the bias point of the amplifier as a function of the compensation control signal, so as to increase the amplifier output power.

According to yet another variant, this method includes steps for sending of a control signal to modify the lateral lobes of a beam, remotely from the module, toward the reception input of the beam forming device, and modification of at least one contribution to a beam in a signal applied to a channel, so as to modify the lateral lobes of this beam.

BRIEF DESCRIPTION OF THE DRAWINGS

Other specific features and advantages of the invention will become clearer after reading the following description that is given as a non-limitative example and with reference to the figures in which.

DETAILED DESCRIPTION OF THE DRAWINGS

The invention proposes a radio-frequency radiation module for a spatial telecommunication antenna. A BFN is designed to apply a signal with contributions to different beams, to the input of several channels. Each channel has an HPA and a radiating feed connected to this HPA. The BFN comprises a device for compensation of the failure of one of the channels that affects at least one beam. This device increases the contribution of one of the signals to this beam.

Thus, the failure of one channel is compensated without the need for redundancy circuits or MPAs. Therefore, the radiation module does not need redundant HPAs and the associated RF switches. Consequently electrical losses, the mass, size, complexity, probability of failure and cost of the radiation module according to the invention are strongly reduced. Furthermore, losses in the Ku and Ka bands are also strongly reduced. Furthermore, the compact size of the antenna using the radiation module according to the invention provides a means of reducing the length of a wave guide or coaxial cables that can be used for the connection of radiating feeds. Furthermore, the phase and amplitude control in HPAs is very much facilitated.

Figure 1:
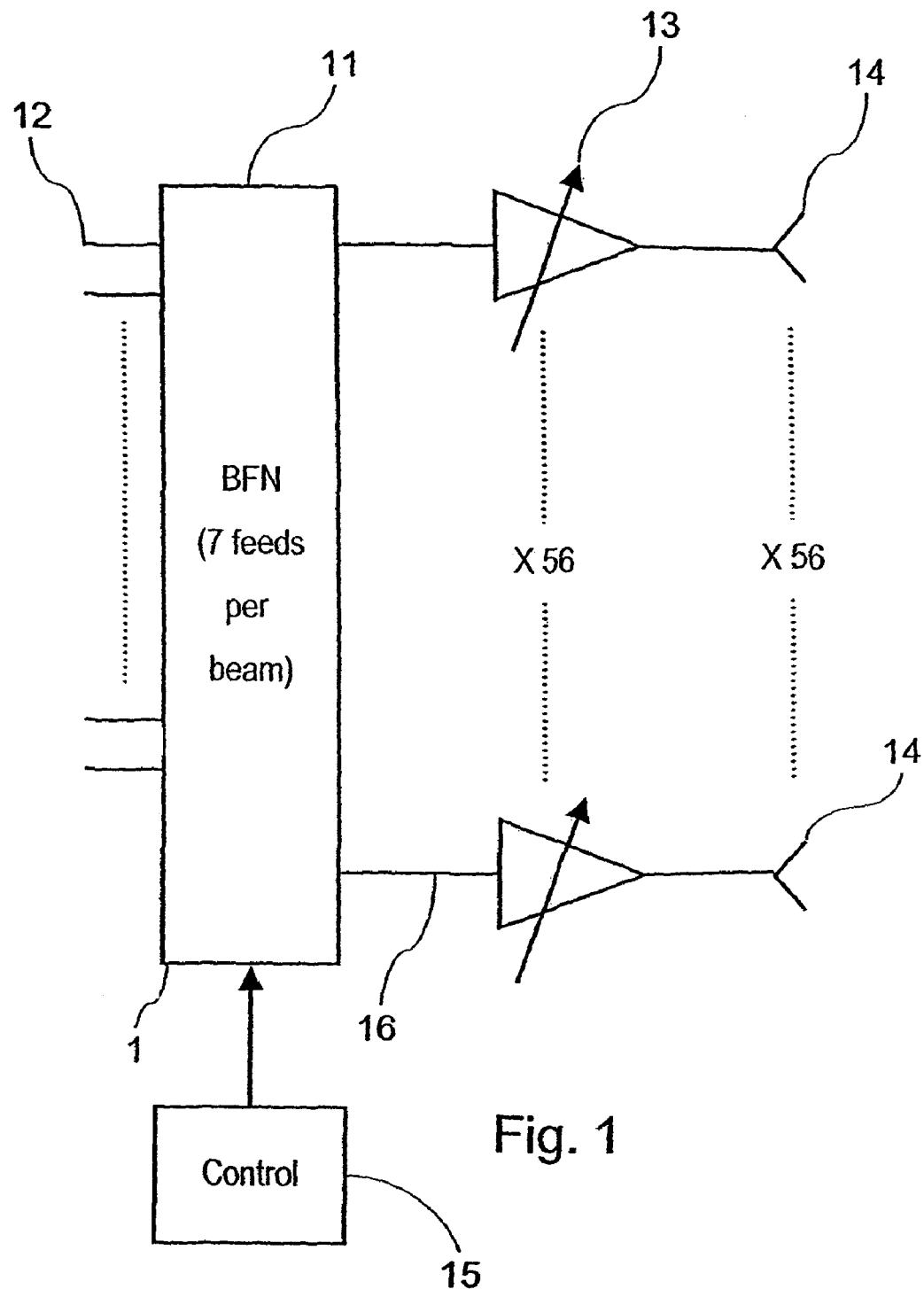
FIG. 1 is a schematic representation of an example of a multi-beam antenna radiation module.

FIG. 1 schematically shows an example of a radiation module 1 of a multi-beam telecommunication antenna for space use. This module 1 includes a BFN 11 with data inputs 12, known in itself. The BFN is capable of applying a signal corresponding to several channels 16 containing contributions to several beams to be radiated. Each channel has an HPA with an adjustable bias point 13 and an antenna radiating feed 14 connected to the output from the HPA. The BFN 11 comprises a selective failure compensation device for one of the channels. For a beam for which the radiation is affected by a failure, the device increases the power of the contribution to this beam in a signal applied on one of the channels.

One of the inputs 15 of the BFN 11 may be provided so as to receive control signals sent from a distance from the module. The control signal may typically be sent from a land station to an orbital antenna in which the module is installed. This control signal may include all the necessary information so that the BFN increases the power of the contribution accordingly. The received control signals may be used to adjust phase and amplitude settings made by the BFN on signals applied to the channels. In particular, this readjustment may help to readjust beam shape characteristics (for example the ration or magnitude of the side lobes).

The BFN 11 will generally be designed to include a contribution to a same beam in signals applied to several channels.

A low power level BFN will preferably be used.

Types of signals output by the BFN and the types of connection between the BFN and the channels may be different. Thus, the BFN is not necessarily directly connected to HPAs. The BFN may also be made in the form of a numeric base band processor with different possible architectures. The BFN may also generate IF or RF signals.

The HPAs used may be of the semiconductor type or of the travelling wave tube type.

Figure 5:
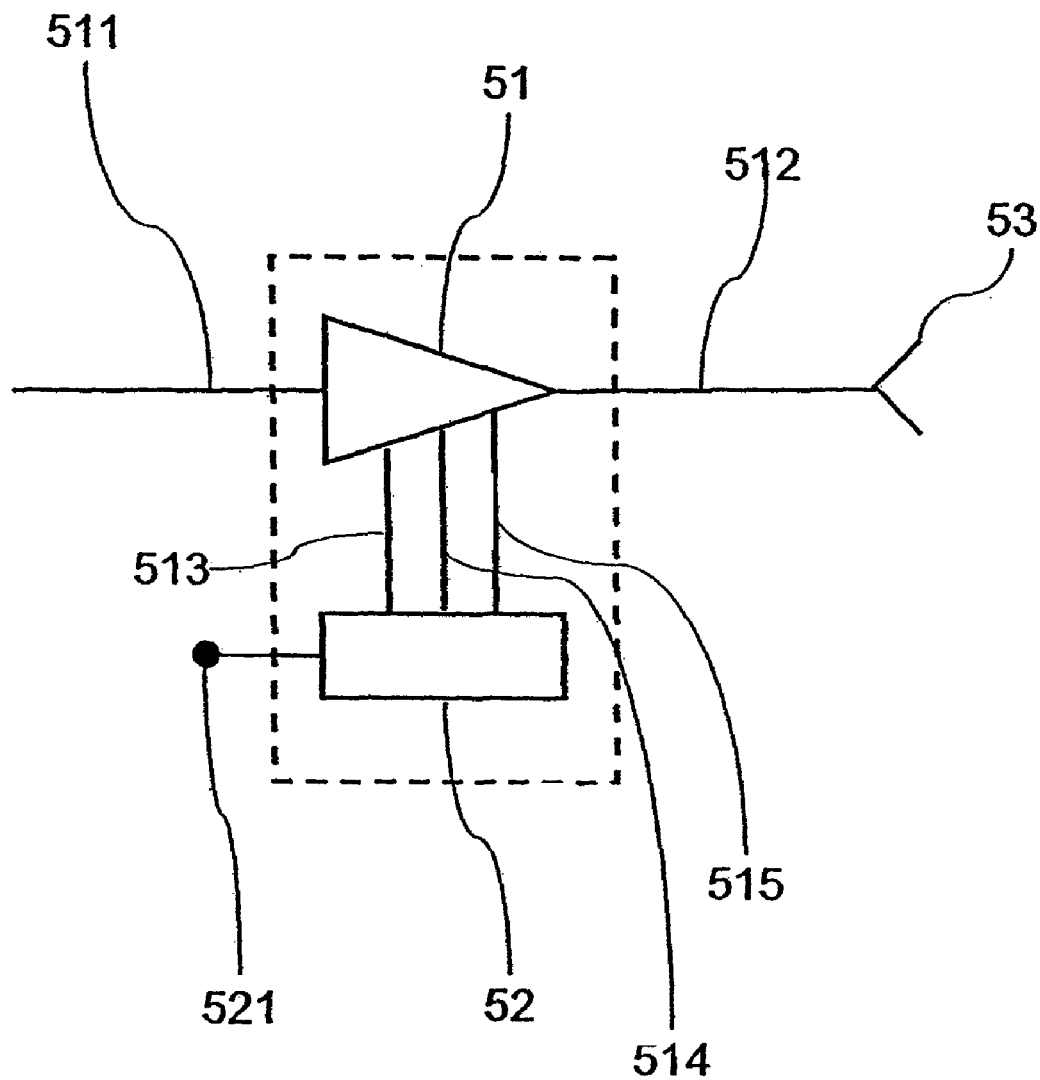
FIG. 5 illustrates an example of connections for adjustment of the bias point of a TWTA type HPA.

A Travelling Wave Tube Amplifier will be used in preference with a bias point that could be controlled. These amplifiers will subsequently be denoted with the abbreviation TWTA. For example, remote controllable TWTAs will be used. FIG. 5 illustrates a channel using an example of such an HPA.

The input 511 of the HPA 51 may be connected to the BFN and its output 512 may be connected directly to the radiating feed 53. The HPA is provided with an adjustable power supply 52. This power supply 52 has a reception input 521 of a remote control signal and has an output interface for application of an adjustment voltage for bias point of the amplifier. The output interface is used to apply an adjustment voltage as a function of a received control signal. Thus, the HPA bias point will be adjusted as a function of the increase in power of some contributions in the signal output by the BFN.

For example, the output interface may have a connection 513 at the anode of the amplifier 51, a connection to the amplifier collector 514, and a connection to the control gate 515 or the helix of the amplifier.

In general, amplifiers with bias point adjustment are also used to reconfigure the power per beam by varying their saturation power. In the example in FIG. 5, the power may be regulated using voltages applied by the power supply 52 to the anode 513 and to the collector 514. The adjustment of the anode voltage provides a means of adjusting the saturation of the radio frequency power.

Figure 2:
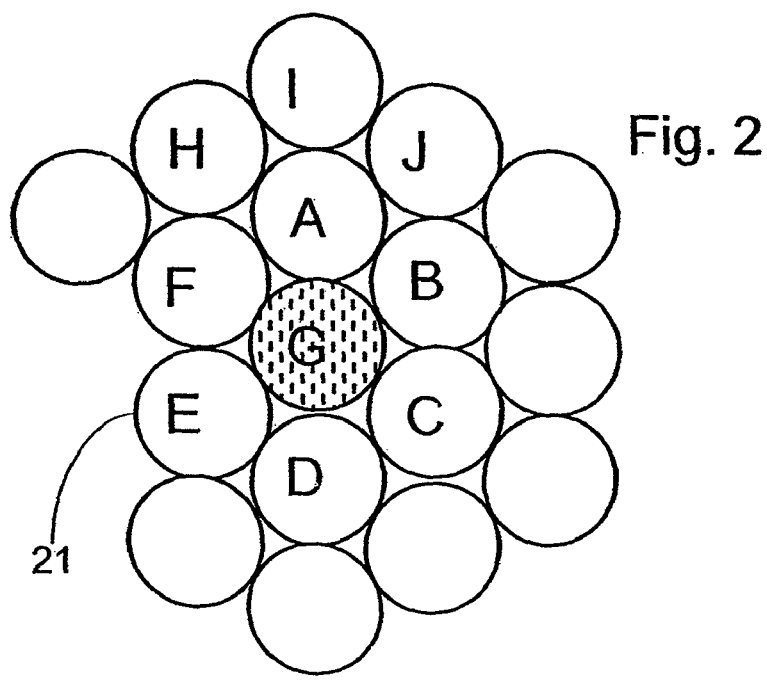
FIG. 2 is a schematic representation of radiating feeds of a radiation array.

The radiation module illustrated in FIG. 1 comprises 56 HPAs connected to 56 corresponding radiating feeds and its specific operation will be described in detail later. FIG. 2 schematically illustrates a portion of a radiating feed array 21 in a configuration compatible with the module in FIG. 1. In the example shown, it is assumed that a beam is normally formed by radiation by 7 radiating feeds. In this example, it is also considered that each radiating feed (apart from edge radiating feeds of the radiation array) normally provides a contribution to 7 beams. Therefore radiating feed groups corresponding to adjacent beams overlap. For simplification purposes, it will be considered that three adjacent radiating feeds are arranged at each of the vertices of an equilateral triangle.

Each radiating feed (apart from the edge radiating feeds of the radiation array) will provide a larger contribution for a beam and a smaller contribution for the other six beams, as will be described in detail later. Therefore each beam will normally be formed by a main contribution from one radiating feed and six other lesser contributions from six other radiating feeds.

Figure 3:
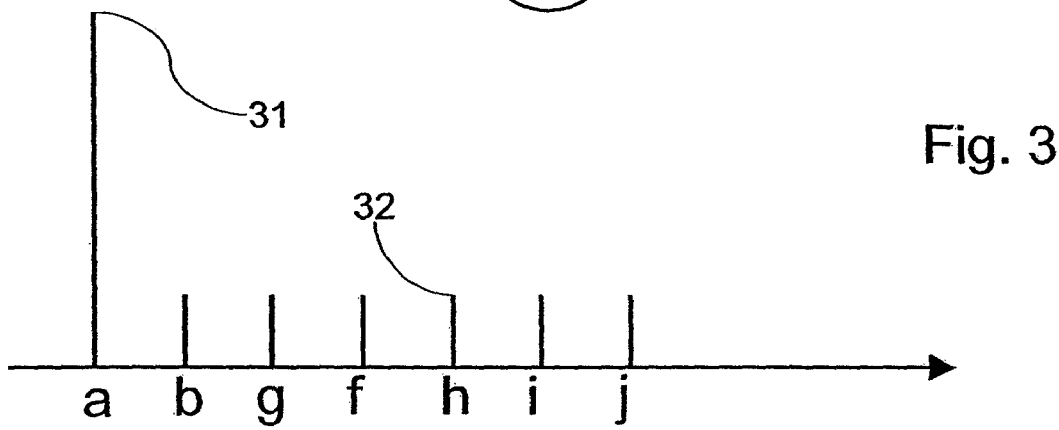
FIG. 3 is a diagram of powers at the input to an amplifier associated with a radiating feed, the powers corresponding to different beams in the absence of an amplifier failure for these beams.
Figure 4:
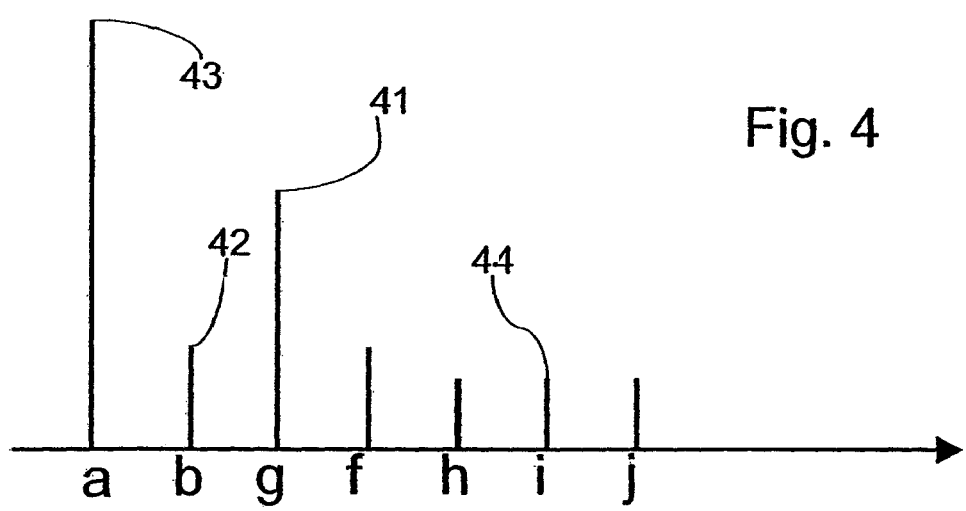
FIG. 4 is a diagram of powers at the input to the amplifier in FIG. 3, the powers corresponding to the different beams at the time of the failure of an amplifier for one of these beams.

FIG. 3 illustrates a contribution of a radiating feed to its beams during normal operation. FIG. 4 illustrates the contribution of this radiating feed to its beams during a failure of an adjacent radiating feed. The abscissas axis in FIGS. 3 and 4 does not identify frequencies but simply the different beams, the contributions to these beams possibly but not necessarily having different frequencies.

The upper case characters A to G identify radiating feeds. The lower case characters a to g identify a beam for which the contribution of the radiating feed with the same character is normally the greatest.

We will start by studying the beam g in normal operation in a simplified case. The beam g is formed by contributions of radiating feeds A to G. In this case, it will be considered that the radiating feed G contributes half of the power of beam g. We will also assume that each radiating feed A to F contributes $1/12$ of the power of the beam g. The radiating feed G will contribute $1/12$ of the power of beams A to F. Obviously, if the radiation power of the beams is different, the power levels of each of these contributions will be adapted accordingly. FIG. 3 illustrates the contribution of radiating feed A to different beams. It is seen that radiating feed A contributes half of its power to beam a, as illustrated by reference 31, and $1/12$ of its power to beams b, g, f, h, i and j respectively, as illustrated by reference 32.

When the HPA of radiating feed G is defective, it will be considered that the power emitted by the radiating feed G is zero, in the most critical case. For beam g, the loss of radio frequency power can then be estimated at 3 dB and the loss of directivity at 2.5 dB. Thus, there is a loss of 5.5 dB on the EIRP. The loss of radio frequency power on beams a to f can be estimated at 0.4 dB, and the loss of directivity can be estimated at 0.5 dB. There is thus a loss of about 1 dB on the EIRP.

In this case, the radiation module will compensate for the failure of radiating feed G, by modifying the radiation powers of radiating feeds A to F, and modifying the contributions of these radiating feeds to different beams. The failure of the radiating feed G has an influence on beams a to g. For beam g, the 5.5 dB loss of the initial EIRPIs is compensated by an increase of 5.5 dB in the contribution of radiating feeds A to F to beam g. In the example of radiating feed A, this contribution is illustrated by reference 41. For beams b and f, the radiating feed A has an increase of 1 dB of its contributions, as illustrated by reference 42 in FIG. 4. Finally, the radiating feed A increases its contribution to beam a by 1 dB, as illustrated by reference 43. The contributions of radiating feed A to beams h, i and j are unchanged, as illustrated by reference 44.

It is found that an increase in the global power of each adjacent radiating feed equal to 1.4 dB is sufficient to compensate for the lack of radiation from radiating feed G. It would thus be possible that HPAs will have a power margin of at least 3 dB during normal operation. One HPA can thus compensate for failures of several HPAs associated with adjacent radiating feeds. In the example described in detail, a margin of 3 dB is sufficient to compensate for the failure of at least two adjacent radiating feeds.

During normal operation, in the case in which the module only manages a single carrier per beam traffic, and with a distribution of contributions similar to those mentioned, it is found that a limited reduction of the output power is sufficient to obtain acceptable linearity performances. There is no intermodulation between two large contributions, in other words two high power carriers. Therefore, non-linear distortions of low power carriers are avoided. This property also provides a means of reducing the global ratio between the radiated radio frequency power and the DC power supply. This ratio can be kept relatively constant for different radio frequency radiation powers. The following ratios were obtained in the simulations made with the above-mentioned parameters, by controlling the anode voltage and optimising the collector voltage:

| Radio-frequency power | RF/DC ratio |
| --- | --- |
| 143 W | 66% |
| 110 W | 66% |
| 72 W | 63.5% |
| 44 W | 58% |
| 14.3 W | 46% |

Although the description provides a detailed and simplified example for several radiating feeds per beam, for a number of contributions per radiating feed and for a given power distribution between radiating feed contributions, the invention is obviously applicable for different values of these parameters. The distribution of the contribution between radiating feeds to a beam will obviously be dependent on optimisation of the antenna design. The distribution of contributions between radiating feeds could also be different from the described distribution.

I claim:

1. A method of operating a radio frequency radiation module comprising a beam forming network capable of applying a plurality of signals, at least some of which provide contributions to a plurality of beams at respective inputs of a plurality of channels, each of said plurality of channels comprising a high-power amplifier having an adjustable bias point and an antenna feed connected to the output of said high-power amplifier, the method comprising:
   detecting a failure of one of said plurality of channels;
   identifying beams affected by said failure, and determining a corresponding loss of EIRP;
   identifying the remaining plurality of channels contributing to said affected beams;
   increasing the contributions of at least some of said remaining plurality of channels to said affected beams in order to compensate for said loss of EIRP; and
   adjusting the bias points of the high-power amplifiers of said remaining plurality of channels in order to provide an increase in required output power.

2. The method according to claim 1, further comprising increasing the contributions of all said remaining channels to said affected beams in order to compensate for said affected beams loss of EIRP.

3. The method according to claim 1, further comprising:
receiving a remotely-generated beam compensation control signal upon a failure of one of said channels; and
based on said beam compensation control, adjusting at least one phase and amplitude settings of the beam-forming network in order to modify the contributions of at least some channels to at least some beams, and adjusting the bias points of said high-power amplifiers in order to increase the output power of said high-power amplifiers.

4. The method according to claim 1, wherein, prior to any channel failure, said high-power amplifiers are operated with a power margin of at least 3 dB.

5. The method according to claim 1, wherein said radio frequency radiation module is carried by a satellite.

6. The method according to claim 1, wherein said high-power amplifiers are chosen from the group comprising:
TWTA and semiconductor amplifiers.

* * * * *